US007028816B2

(12) United States Patent
Baumgartner et al.

(10) Patent No.: US 7,028,816 B2
(45) Date of Patent: *Apr. 18, 2006

(54) BRAKE DISK/HUB COMBINATION AND INTERMEDIATE ELEMENTS FOR A BRAKE DISK/HUB COMBINATION

(75) Inventors: Hans Baumgartner, Moosburg (DE); Wolfgang Pahle, Heilbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/071,300

(22) Filed: Mar. 4, 2005

(65) Prior Publication Data

US 2005/0173204 A1 Aug. 11, 2005

Related U.S. Application Data

(63) Continuation of application No. 09/959,214, filed on Jan. 15, 2002, now Pat. No. 6,910,556.

(30) Foreign Application Priority Data

Apr. 21, 1999 (DE) ................................ 199 18 069

(51) Int. Cl.
*B60T 1/06* (2006.01)

(52) U.S. Cl. .............................. 188/218 XL; 188/18 A

(58) Field of Classification Search ..................... None
See application file for complete search history.

(56) References Cited

U.S. PATENT DOCUMENTS

| | | | | |
|---|---|---|---|---|
| 2,070,847 | A * | 12/1937 | Sargent | 188/218 R |
| 2,190,767 | A * | 2/1940 | Benson | 188/218 XL |
| 3,066,766 | A * | 12/1962 | Minor et al. | 188/78 |
| 3,730,304 | A * | 5/1973 | Buyze | 188/218 XL |
| 3,754,624 | A * | 8/1973 | Eldred | 188/71.5 |
| 4,132,294 | A * | 1/1979 | Poli | 188/218 XL |
| 4,550,808 | A * | 11/1985 | Folson | 188/1.12 |
| 5,005,676 | A * | 4/1991 | Gassiat | 188/218 XL |
| 5,007,508 | A * | 4/1991 | Lacombe | 188/251 A |
| 5,190,124 | A * | 3/1993 | Haneda | 188/218 XL |
| 5,383,538 | A * | 1/1995 | Bair et al. | 188/218 R |
| 5,810,123 | A * | 9/1998 | Giorgetti et al. | 188/218 XL |
| 6,035,978 | A * | 3/2000 | Metzen et al. | 188/218 XL |
| 6,139,215 | A * | 10/2000 | Kuhne et al. | 403/337 |
| 6,374,956 | B1 * | 4/2002 | Naeumann et al. | 188/18 A |
| 6,467,588 | B1 * | 10/2002 | Baumgartner et al. | 188/218 XL |
| 6,564,913 | B1 * | 5/2003 | Baumgartner et al. | 188/218 XL |

FOREIGN PATENT DOCUMENTS

| | | |
|---|---|---|
| DE | 24 26 952 | 1/1976 |

(Continued)

*Primary Examiner*—Melody M. Burch
(74) *Attorney, Agent, or Firm*—Crowell & Moring LLP

(57) ABSTRACT

The invention relates to a brake disk/hub combination and to intermediate elements for a brake disk/hub combination which are based on the following constructive design: the brake disk is provided with support elements on its inner periphery, the brake disk hub is provided with cams on its outer periphery and intermediate elements are radially distributed in the peripheral direction between the brake disk hub and the brake disk. The intermediate elements project into intermediate spaces that extend between the cams and the support elements. The intermediate elements are substantially configured as strips, L-or T-shaped elements and are axially secured against being displaced by at least one retainer ring and/or one rim section of the brake disk hub. Optionally or alternatively the sections of the intermediate elements that project into the intermediate spaces are folded.

11 Claims, 9 Drawing Sheets

FOREIGN PATENT DOCUMENTS

| | | | | |
|---|---|---|---|---|
| DE | 3216108 | A1 | * | 12/1982 |
| DE | 34 41 304 | A1 | | 5/1985 |
| DE | 3436729 | A1 | * | 4/1986 |
| DE | 195 44 559 | C1 | | 7/1997 |
| DE | 197 26 674 | A1 | | 1/1998 |
| EP | 0127932 | A1 | * | 12/1984 |
| EP | 0309174 | A1 | * | 3/1989 |
| GB | 2 093 949 | | | 9/1982 |
| GB | 2150263 | A | * | 6/1985 |
| JP | 646534 | A | * | 1/1989 |
| JP | 431154 | A | * | 2/1992 |
| WO | WO-9720151 | A1 | * | 6/1997 |

* cited by examiner

Fig. 9
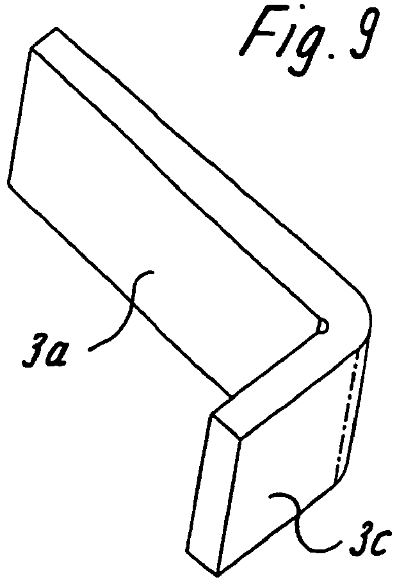
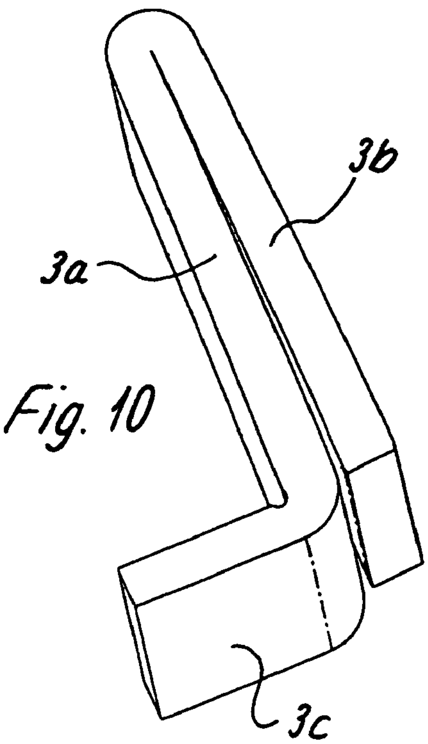
Fig. 10
Fig. 11
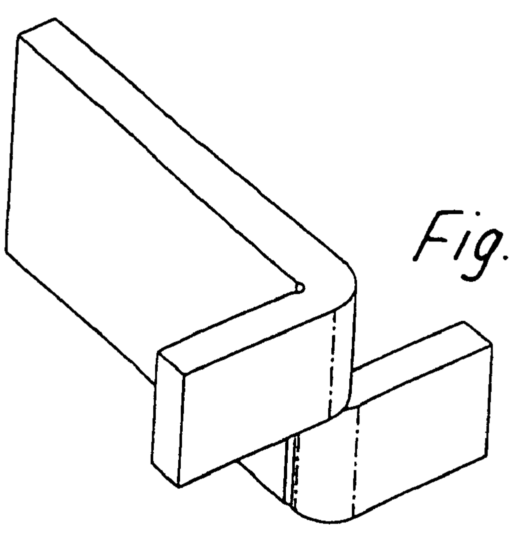

BRAKE DISK/HUB COMBINATION AND INTERMEDIATE ELEMENTS FOR A BRAKE DISK/HUB COMBINATION

CROSS REFERENCE TO RELATED APPLICATION

This application is a continuation of application Ser. No. 09/959,214, filed Jan. 15, 2002 now U.S. Pat. No. 6,910,556.

BACKGROUND AND SUMMARY OF THE INVENTION

The invention relates to a brake disk/hub combination with a disk/hub connection for connecting a brake disk with a brake disk hub, having the following constructive design. The brake disk has support elements on its inner periphery; the brake disk hub is provided with cams on the outer periphery; intermediate elements are distributed in the peripheral direction radially between the brake disk hub and the brake disk, which intermediate elements project into intermediate spaces extending between the cams and the supporting element in the peripheral direction and thus ensure a transmission of the braking torque from the brake disk to the brake disk hub. The invention also relates to the designs of the intermediate elements for a brake disk/hub combination.

A brake disk with the characteristics of the above-mentioned type—thus, an internally ventilated brake disk having two friction rings with the pertaining brake disk hub—is known from German patent document DE 195 44 559 C1. In the case of this brake disk, for connecting the brake disk with the brake disk hub, intermediate elements are provided for torque and force transmission from the cams of the brake disk hub to the supporting elements of the brake disk which can be fastened on the cams of the brake disk hub, for example, by bolts. In this case, on the one hand, the cams of the brake disk hub engage in the intermediate elements and, on the other hand, the intermediate elements engage in the supporting elements, so that a reliable torque transmission from the brake disk to the brake disk hub is ensured in both rotating directions.

The brake disk of German patent document DE 195 44 559 C1 has been found successful per se, but a further simplified mounting with low manufacturing and material costs is desirable. With respect to the mounting, a screwed connection susceptible to rust is to be avoided. It is an object of the present invention to solve this problem by providing particularly advantageous intermediate elements.

The invention solves this problem by means of the present invention.

In contrast to the prior art of the above-mentioned type, the intermediate elements according to the invention are essentially strip-shaped (or I-shaped), L-shaped or T-shaped, and/or at least the sections of the intermediate elements projecting into the intermediate spaces are constructed to be folded—preferably in a V-shape. Preferably, the intermediate elements are axially secured at least on one side by a retaining ring or other equivalent measures, such as a collar section of the brake disk hub.

Because of their simple geometry, the strip-shaped intermediate elements are extremely easy to produce. They are, for example, punched out of a steel plate and, if possible, are rebent only once corresponding to their geometry. When used in particular together with the idea of a retaining ring securement, (thus by a retaining ring engaging in a groove of the brake disk hub), the intermediate elements permit an extremely simple mounting. The retaining ring securement also ensures in a simple manner an axial fixing of the intermediate elements as well as of the brake disk on the brake disk hub.

When constructed as an L-shaped or T-shaped element, the strip section projecting into the gap, in each case, takes over the function of a thermal conduction barrier. As a result of the base sections of the L or of the T, a respective defined axial fit of the intermediate elements is also achieved in a simple manner.

The basic principle of the folding of the intermediate elements results in an additional temperature barrier. The folding therefore contributes decisively to minimizing the heat transition between the brake disk hub and the brake disk.

If, in addition, the folded sections of the intermediate elements are elastically prestressed, the principle of the folding in conjunction with the elasticity of the intermediate elements results in the surprising double function of a thermal conduction barrier and a better compensation of the measurement tolerances between the brake disk and the brake disk hub.

According to another advantageous embodiment of the invention, the thermal transition in the intermediate gap expediently can be further reduced by an additional surface coating and/or an additional insulating layer in the area of the intermediate gap.

In a further advantageous embodiment of the invention, a retaining ring securement is implemented on both sides of the brake disk. In this case, optionally all sections of the intermediate elements projecting from the intermediate space between the cams and the supporting elements can be eliminated.

In addition, for reducing the thermal conductivity and for ensuring a good force transmission between the brake disk and the brake disk hub, it is expedient for the intermediate elements to consist of a pressure resistant material, which has a lower thermal conductivity than the brake disk.

According to another particularly preferred embodiment of the invention, the strip-shaped intermediate elements are constructed as formed sheet metal parts, which can be produced in a particularly uncomplicated and cost-effective manner. The intermediate elements could be made of stainless steel.

If the intermediate elements are held by means of a retaining ring arrangement only on one side, the intermediate elements are advantageously provided in one of their end areas in each case with a projection or an elastic snap nose designed for engaging/reaching-behind a recess. An undercut or groove on the brake disk nub interacts with the snap nose, whereby the intermediate elements are axially secured in one direction by the projection and in the other direction by the projections, particularly the snap nose.

As an alternative, the intermediate elements are axial secured in both axial directions in a constructively simple manner by a surrounding retaining ring, which is guided through grooves in the cams of the brake disk hub and through grooves or recesses of the intermediate elements.

According to another preferred embodiment, at least one of the cams of the brake disk hub is provided with a radially outward-projecting collar which axially secures the brake disk toward one side when it is placed on the brake disk hub. The collar interacts with an attachment of the brake disk, which is formed by a step on the inner periphery of the brake disk. Even after an extended operation under high stress, it will still be easily possible to demount the brake disk from the wheel hub. Furthermore, the axial fastening devices "collar at the cam" and "stepped inner periphery of the brake disk" can be shaped out during the manufacturing of the brake disk hub and the brake disk, so that separate fastening devices are eliminated at least for one of the two axial directions. The at least one collar is therefore preferably molded in one piece to the axial end areas of the cams.

Additional advantageous variants of the invention are described herein.

Other objects, advantages and novel features of the present invention will become apparent from the following detailed description of the invention when considered in conjunction with the accompanying drawings.

BRIEF DESCRIPTION OF THE DRAWINGS

FIGS. 6 to 14 are views of various intermediate elements according to the invention for a brake disk/hub combination.

DETAILED DESCRIPTION OF THE DRAWINGS

Figure 1:
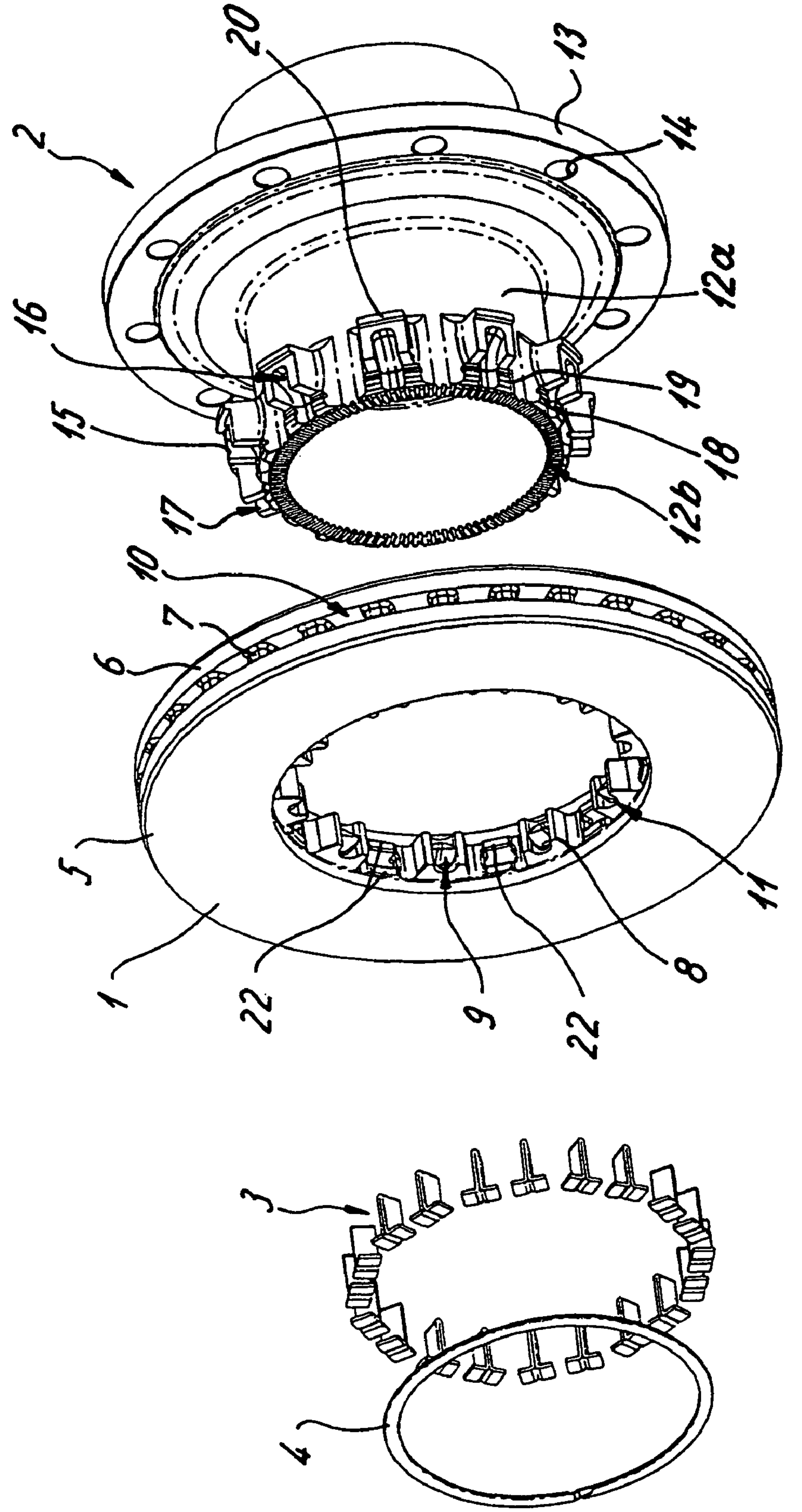
FIG. 1 is an exploded view of a brake disk/hub combination according to the invention.
Figure 2:
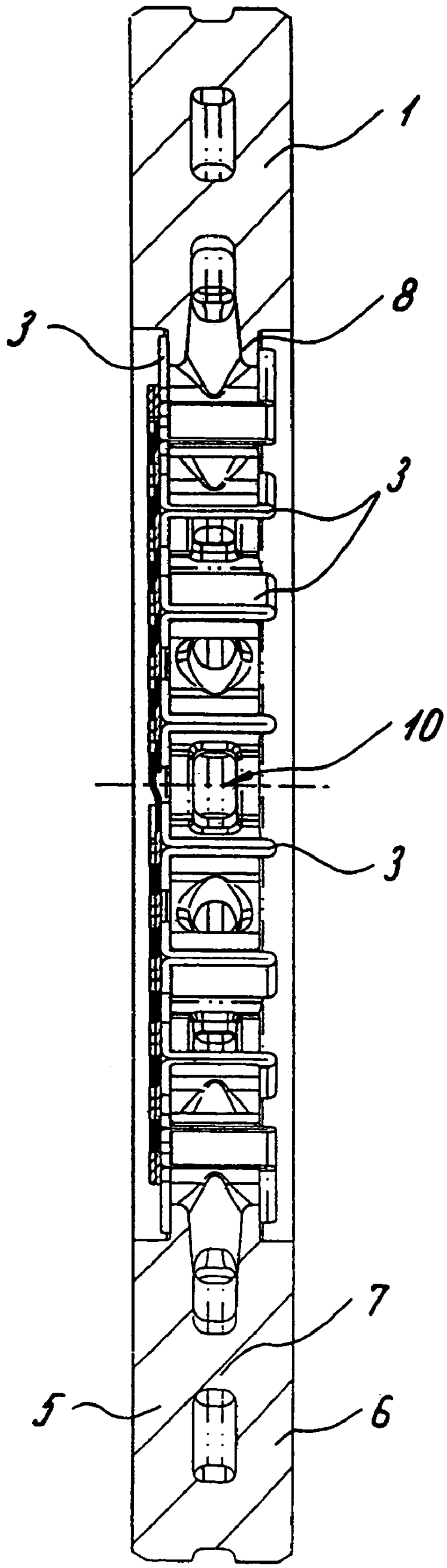
FIG. 2 is a partial sectional view of the brake disk of FIG. 1 with intermediate elements analogous to FIG. 1.
Figure 3:
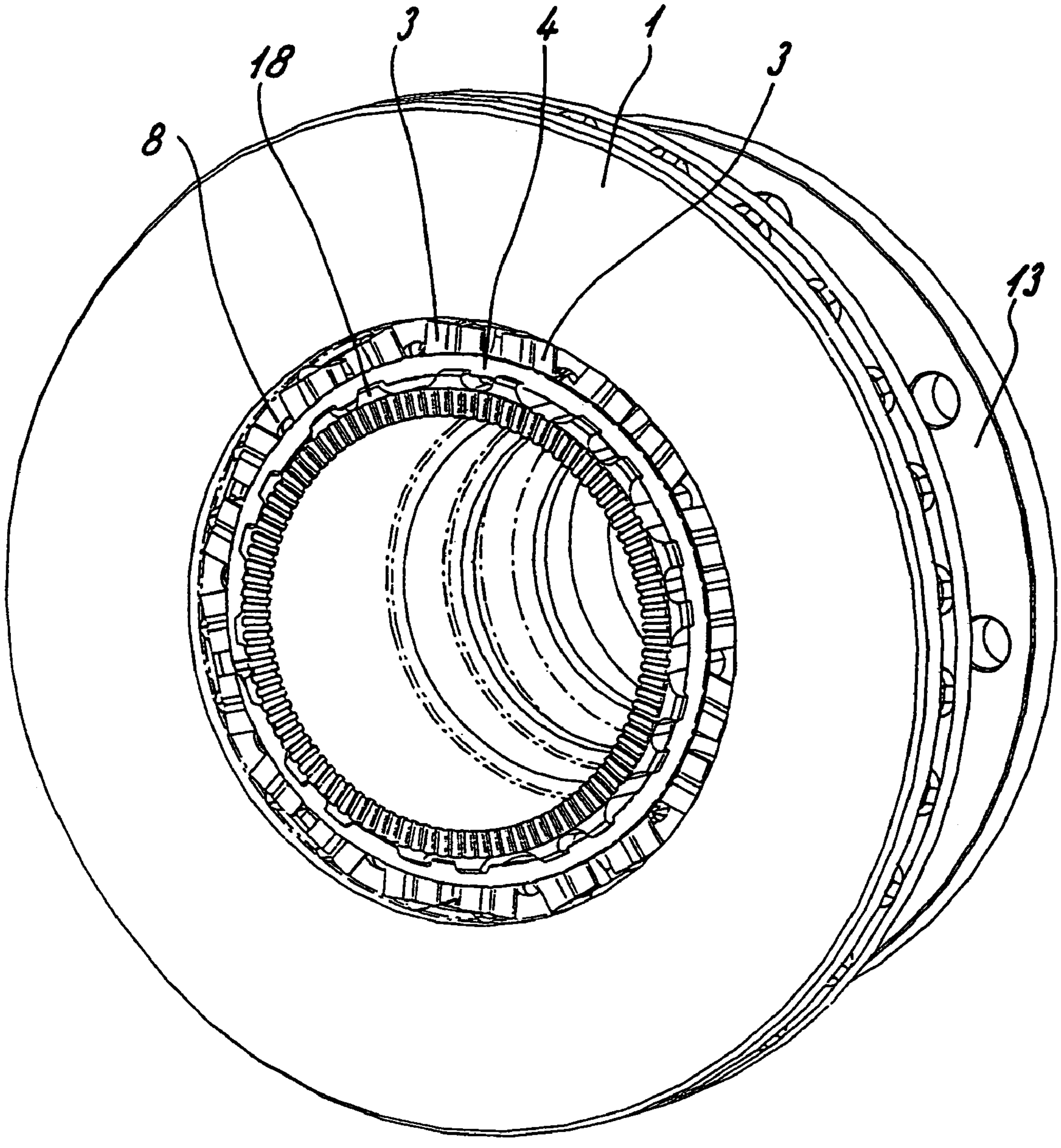
FIG. 3 is a perspective view of a brake disk of the type of FIG. 1 mounted on a brake disk hub.
Figure 4:
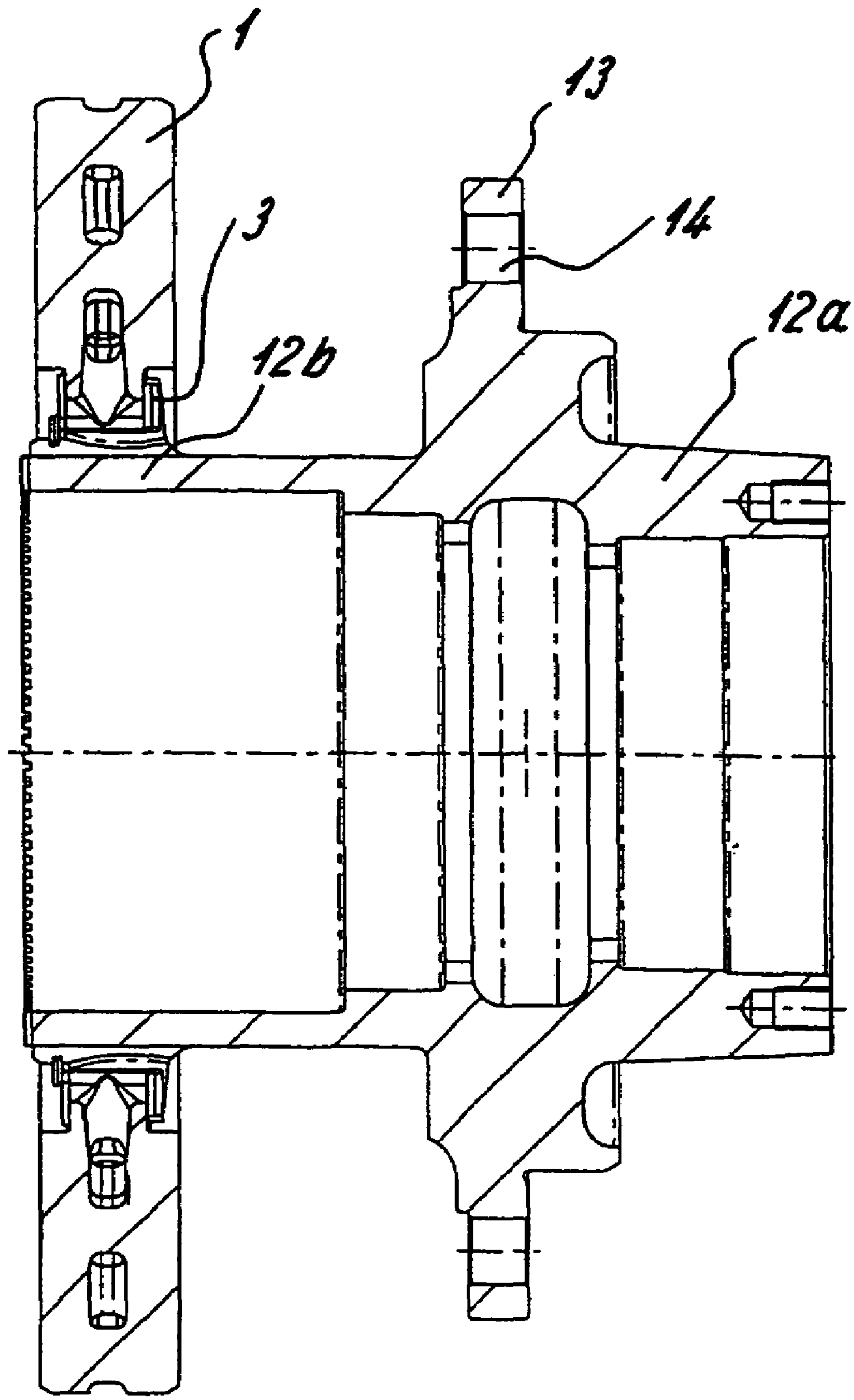
FIG. 4 is a cross-sectional view of the brake disk according to FIG. 3 mounted on the brake disk hub.
Figure 5:
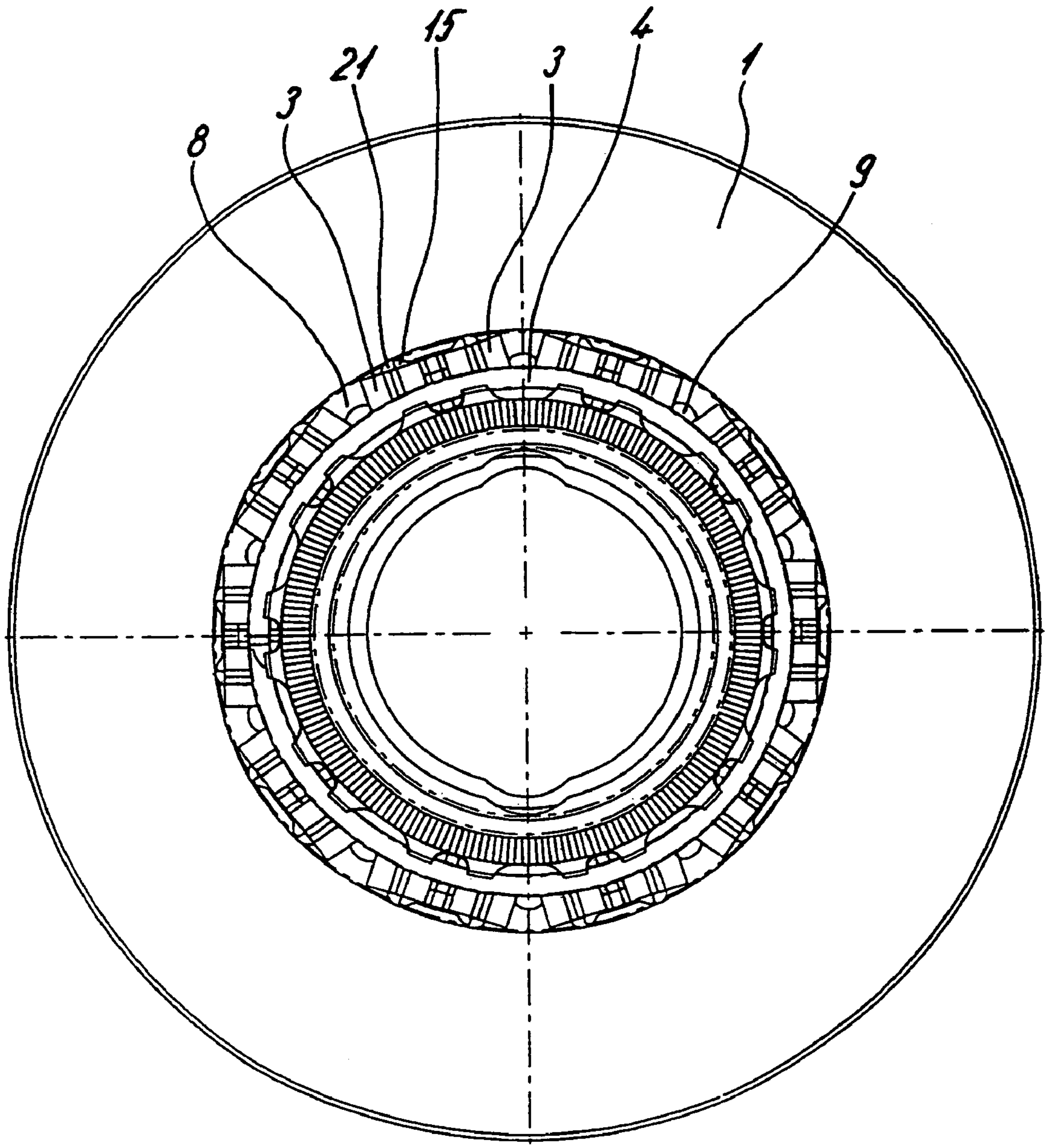
FIG. 5 is a top side view of the brake disk according to FIG. 3 mounted on the brake disk hub.

FIG. 1 is an exploded view of a disk/hub combination including a brake disk 1 (the latter is preferably constructed in a divided manner which is not shown here and is known per se), a wheel and brake disk hub 2, a plurality of intermediate elements 3 and a retaining ring 4. The wheel and brake disk hub 2 does not necessarily have to be constructed in one piece with a wheel hub (or not simultaneously also as a wheel hub), but it can be used to slide onto a separate hollow-cylindrical wheel hub (not shown here). This may be advantageous with respect to manufacturing in the case of different wheel hub constructions.

The internally ventilated brake disk 1 of FIG. 1, which is suitable particularly for heavy commercial vehicles above 7.5 t equipped with pneumatic disk brakes, has two friction rings 5, 6 which are connected with one another by way of webs 7. Supporting elements 8 are molded to the inner periphery of the brake disk 1. These supporting elements 8 project essentially trapezoidally from the inner periphery of the friction rings 5, 6 toward the interior and, for feeding cooling air into the interior of the brake disk 1, are penetrated by openings 9. The openings 9 extend essentially radially through the supporting elements 8 and permit cool air to be fed into the air gap 10 between the two friction rings 5, 6. The openings 9 end toward the center of the brake disk in axial recesses 11, so that, during driving, a cooling air supply is possible through the supporting elements 8 into the air gap 10 between the friction rings 5, 6.

The wheel hub 2 of FIGS. 1 to 5 has a pot-shaped hollow-cylindrical section 12 and a disk-type section 13 having bores 14. The axial end of the hollow-cylindrical section 12*a* facing away from the disk-type section 13 toward the brake disk is adjoined by another axial hollow-cylindrical end section 12*b*, on whose outer periphery, radially outward-projecting cams 15 are distributed.

In the top view of the outer periphery of the disk hub 2, the radially outward-projecting cams 15 are U-shaped, an air duct 16 being constructed between the legs of the U, which air duct extends from the radial exterior side of the cams 15 in a sloped manner to the radial line of the brake disk hub 2. The base leg of the U widens toward the brake disk hub interior. The air duct 16 ends in an axial opening 17 at the axial end of the brake disk hub 2 facing the brake disk 1. In this manner, an air supply can be implemented from the axial face side of the brake disk hub 2 through the cams 15 into the air gap 10 of the brake disk 1.

The opening or recess 17 on the face of the brake disk hub 2 adjoins a surrounding projection 18 (with a face-side ABS cogwheel toothing), which is provided with a surrounding ring groove 19 on its outer periphery. As also illustrated in FIG. 1, the cams 15 of the brake disk hub 2 are each provided with a radially outward-projecting collar 20, which partially radially lengthens the base side of the U-shaped cams 15 toward the outside.

As indicated by the interaction of FIGS. 1 to 5, the brake disk 1 can be pushed axially onto the brake disk hub 2. The cams 15 and the supporting elements 8 engage in one another in the peripheral direction about the hub. The folded "legs" of the T-shaped intermediate elements 3 are pushed into intermediate spaces 21 (see FIG. 5) that remain between the cams 15 and the supporting elements 8. During braking, the braking torque is transmitted from the supporting elements 8 of the brake disk 1 by way of intermediate elements 3 to the cams 15 of the brake disk hub 2. In this case, the intermediate elements 3 are particularly used also advantageously as a temperature barrier between the cams 15 and the brake disk hub 2 and the brake disk 1.

The brake disk 1 is axially secured on the cams 15 of the brake disk hub 2 on one side of the brake disk by the above-described collars 20 formed on the cams 15. The collars 20 of the cam 15 rest on radially inwardly shaped-on attachments or collars 22 of the brake disk 1. On the opposite axial side of the brake disk 1, the brake disk is axially secured by the retaining ring 4 inserted into the groove 19. Furthermore, the retaining ring 4 also axially secures the T-shaped intermediate elements 3 from falling out in the axial direction. The "roof section" of the T-shaped intermediate elements prevents the intermediate elements from falling out toward the opposite side. As a result of the unfolding of the "T", a simple possibility is created for compensating measuring tolerances; also, an additional temperature barrier is created between the brake disk 1 and the hub 2.

Figure 6A:
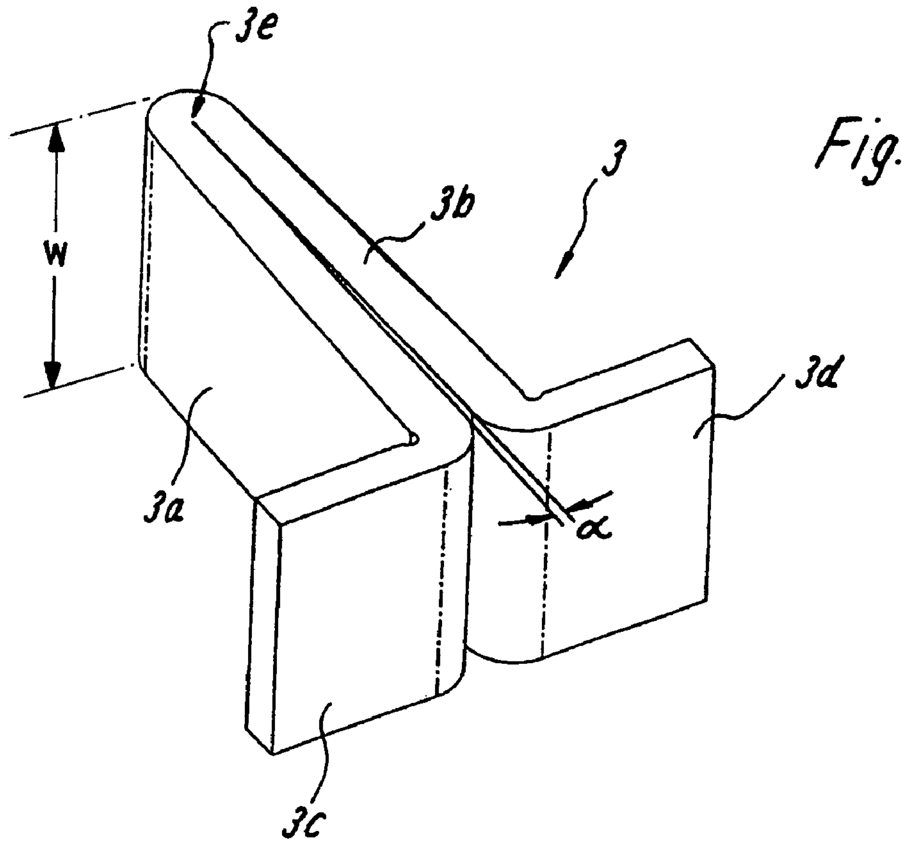
Figure 6B:
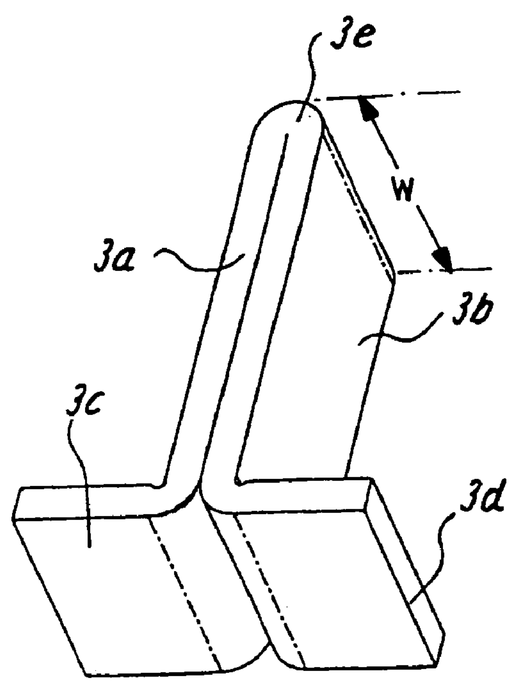

FIGS. 6*a* and 6*b* are perspective views of the T-shaped intermediate elements 3 from FIGS. 1 to 5. In this case, the sections of the intermediate elements 3 projecting into the intermediate spaces 21 (see FIG. 5) have a folded construction across width "W" of the T therefore consists of two adjoining (strip) sections 3*a*, 3*b*, which are in each case adjoined at a right angle by roof sections 3*c*, 3*d*. As a result of an unbending in the fold 3*e*, an angle $\alpha$ is created between the strip sections 3*a*, 3*b*, which angle $\alpha$ is used for the compensation of tolerances when the brake disk 1 and the hub 2 are fitted together (elastic prestressing). A heat insulation element 50 (see FIG. 10) can be inserted into the resulting gap between the strip sections 3*a*, 3*b*. The T-shape eliminates the necessity of a second retaining ring for securing the intermediate elements. This embodiment is particularly recommended when the actual brake disk 1 is already axially secured by collars of the cams or by an equivalent measure. In addition, the sections 3*c*, 3*d* simplify the handling of the intermediate elements because they optionally, for example, easily allow tongs or pliers to be applied to pull-out the elements should they slightly jam during the brake disk exchange. FIG. 6*b* illustrates the installed condition, in which the angle α can be reduced to zero degrees.

Figure 7:
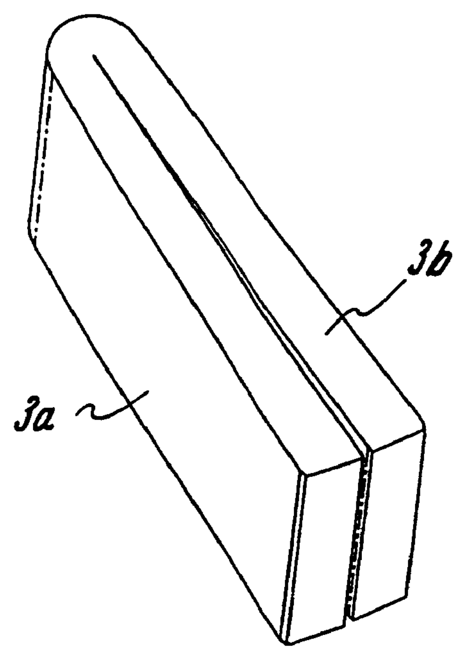

A simplified embodiment of the intermediate elements is illustrated in FIG. 7. In this embodiment, the "roof" of the T is essentially left off. In this case, the intermediate element therefore consists only of a single-folded sheet metal strip, which can be fitted into the intermediate space (not shown). In this case, the axial retaining ring securing arrangement should be provided on both axial end sides of the brake disk. This embodiment is useful when no collars 20 are provided on the cams 15 of the hub 2 to axially secure the brake disk 1.

Figure 8:
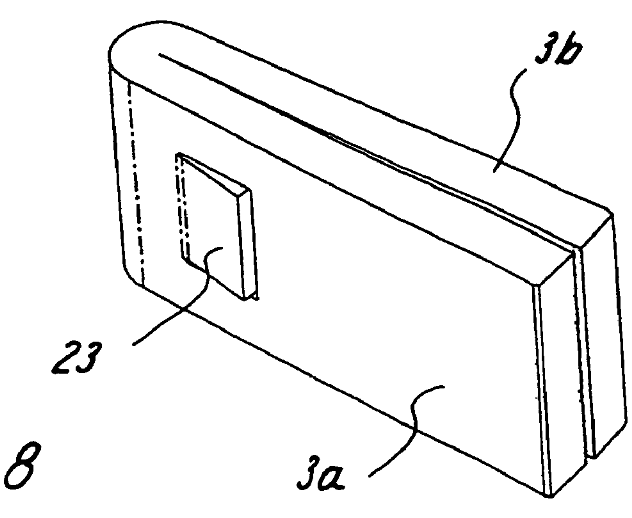

According to FIG. 8, an elastic nose 23 is provided on one side on the folded sheet metal strip intermediate element, which elastic nose secures the intermediate element in one direction against a falling-out. The opposite axial securing can be implemented by a retaining ring 4. A second retaining ring can be eliminated if the axial securing of the brake disk takes place in a different manner (for example, by the above-mentioned collars on the cams 15).

FIGS. 9 to 11 show additional variants of the invention. Thus, according to FIG. 9, a sheet metal strip shaped as an "L" is used as the intermediate element 3, in which case the base section 3*c* of the L takes over the axial securing toward one side (this embodiment uses sections 3*a* and 3*c* of the elements of FIG. 6). Since no unfolding is possible, the compensation of measuring tolerances is slightly more limited than according to FIGS. 6 to 8. Therefore, according to FIG. 10, the leg section of the L, as an alternative, is nevertheless designed to be unfolded (this embodiment uses sections 3*a*, 3*b* and 3*c* of the elements of FIG. 6). In contrast, according to FIG. 11, the base side 3*c* of the L is split open to a T-shape which improves the handling and the axial securing in comparison to FIG. 9.

Figure 12:
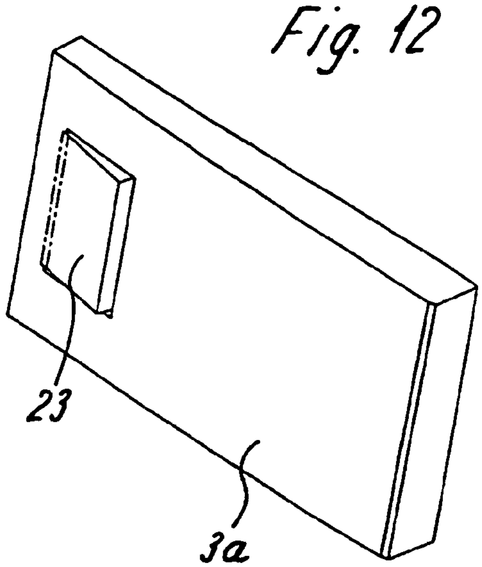
Figure 13:
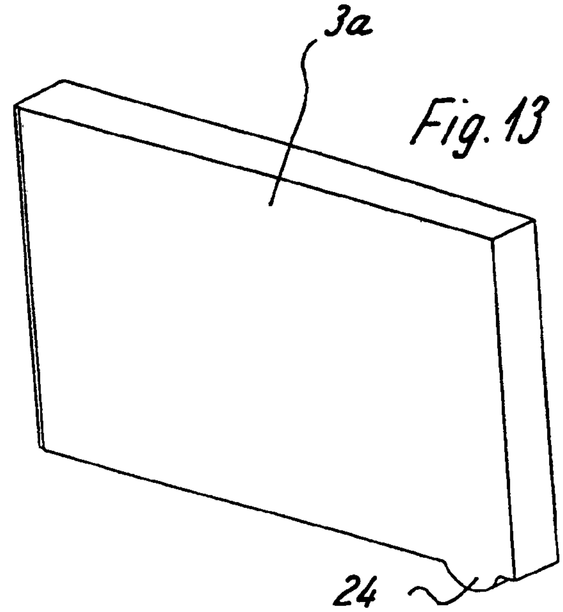
Figure 14:
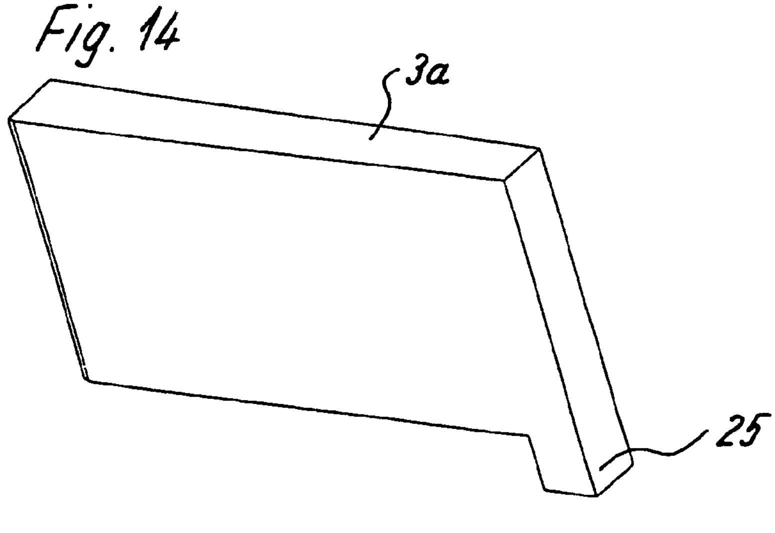

The intermediate elements 3 are still further "minimized" and thus reduced in cost according to embodiments 12 to 14. In these embodiments, only a rectangular sheet metal strip section 3*a* is used as an intermediate element, which is pushed into the intermediate spaces 21. According to FIG. 12, the axial securing in one direction again takes place by means of a snap nose 23. FIG. 13 illustrates a type of hump or point 24 on the sheet metal strip 3*a* which is designed to engage in a corresponding groove (not shown) in the hub 2. For the installation, this element must be tilted. An additional retaining ring in the hub or through all nose 25 on one of its sides. By means of this nose 25, the intermediate element is supported on the hub 2 and is additionally secured by a retaining ring 4.

| Table of Reference Numbers | |
|---|---|
| Brake disk | 1 |
| disk hub | 2 |
| intermediate elements | 3 |
| retaining ring | 4 |
| friction rings | 5, 6 |
| webs | 7 |
| supporting elements | 8 |
| openings | 9 |
| air gap | 10 |
| recesses | 11 |
| hollow-cylindrical section | 12 |
| disk-type section | 13 |
| bores | 14 |
| cam | 15 |
| air duct | 16 |
| opening | 17 |
| projection | 18 |
| ring groove | 19 |

-continued

| Table of Reference Numbers | |
|---|---|
| collar | 20 |
| intermediate spaces | 21 |
| collar | 22 |
| snap nose | 23 |
| hump | 24 |
| nose | 25 |

What is claimed is:

1. Brake disk/hub combination, comprising a brake disk and a brake disk hub, wherein:

a) the brake disk has supporting elements on an inner periphery, b) the brake disk hub is provided with cams on an outer periphery, c) intermediate elements are distributed radially between the brake disk hub and the brake disk in a peripheral direction, the intermediate elements projecting into intermediate spaces formed between the cams and the supporting elements in a circumferential direction to ensure a transmission of braking torque from the brake disk to the brake disk hub, d) each of the intermediate elements being made of a strip-shaped material, and e) wherein at least a section of one of the intermediate elements projecting into one of the intermediate spaces is folded in a substantially V-shape viewed in a section plane parallel to an axial direction of the disk/hub combination and perpendicular to a radial direction.

2. Brake disk/hub combination according to claim 1, wherein the folded section of the at least one intermediate elements is constructed to be elastically prestressed.

3. Brake disk/hub combination according to claim 1, further comprising a heat insulating element inserted into an intermediate gap formed in an area of the folded section of the at least one intermediate elements.

4. Brake disk/hub combination according to claim 1, further comprising means for securing the intermediate elements projecting into the intermediate spaces in an axial direction.

5. Brake disk/hub combination according to claim 4, wherein the means for securing includes at least one retaining ring.

6. Brake disk/hub combination according to claim 4, wherein the intermediate elements are each provided with a projection, the projection of each of the intermediate elements operatively engaging a recess or groove on the brake disk hub or extending behind an undercut on the brake disk hub.

7. Brake disk/hub combination according to claim 6, wherein the securing means of the intermediate elements in one axial direction takes place by a retaining ring and, in the other axial direction, takes place by the projection of each of the intermediate elements.

8. A brake disk and hub connection for a brake disk having supporting elements on an inner periphery and a hub having cams on an outer periphery, the connection comprising:

intermediate elements formed of a strip-shaped material, each having at least a folded section defining a fold having an edge along a width of the strip-shaped material; and wherein said intermediate elements are distributed radially between the hub and the brake disk in circumferentially arranged gaps formed between adjacent supporting elements and cams to ensure a brake torque transmission from the brake disk to the hub, the folded section of each of said intermediate elements projecting into a corresponding one of the gaps such that the edge extends in a radial direction.

9. Brake disk/hub combination according to claim 8, further comprising means for securing the intermediate elements projecting into the intermediate spaces in an axial direction.

10. The disk/hub connection according to claim 8, further comprising a heat insulator arranged in between the folded section of each of the intermediate elements.

11. Brake disk/hub combination according to claim 9, wherein the means for securing includes at least one retaining ring.

* * * * *